(12) United States Patent
Sun et al.

(10) Patent No.: US 8,430,577 B2
(45) Date of Patent: Apr. 30, 2013

(54) ELECTRICAL CONNECTOR WITH IMPROVED CONTACT ARRANGEMENT

(75) Inventors: Zheng-Guo Sun, Kunshan (CN); Jia-Yong He, Kunshan (CN); Zhong-Hua Yao, Kunshan (CN); Qi-Sheng Zheng, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 442 days.

(21) Appl. No.: 12/752,401

(22) Filed: Apr. 1, 2010

(65) Prior Publication Data

US 2010/0254661 A1   Oct. 7, 2010

(30) Foreign Application Priority Data

Apr. 2, 2009 (CN) .......................... 2009 2 0301852

(51) Int. Cl.
*G02B 6/36* (2006.01)
*H01R 33/945* (2006.01)

(52) U.S. Cl.
USPC ................................ 385/92; 385/88; 439/577

(58) Field of Classification Search ...................... 385/75, 385/88–94; 439/577
See application file for complete search history.

(56) References Cited

U.S. PATENT DOCUMENTS 5,769,666 A   6/1998  Wu

*Primary Examiner* — Uyen Chau N Le
*Assistant Examiner* — Michael Mooney
(74) *Attorney, Agent, or Firm* — Wei Te Chung; Ming Chieh Chang

(57) ABSTRACT

An electrical connector defining a receiving opening for receiving a corresponding plug includes an insulative housing, a number of contacts and an optical module attached to the insulative housing. The insulative housing has a tongue extending into the receiving opening and a cavity behind the receiving opening. Each contact has a retaining portion retained in the insulative housing, a contact portion extending to the tongue, a tail portion and a connecting portion connecting the retaining portion and the tail portion. The optical module is forwardly assembled into the cavity from a rear side of the insulative housing and exposed to the receiving opening. The connecting portions are offset relative to the contact portions of the corresponding contacts in a transverse direction so as to leave said cavity open rearward and allow said optical module to be assembled into the cavity from the rear side of the insulative housing.

19 Claims, 13 Drawing Sheets

ELECTRICAL CONNECTOR WITH IMPROVED CONTACT ARRANGEMENT

BACKGROUND OF THE INVENTION

1. Field of the Invention

The present invention relates to electrical connectors, more particularly to electrical connectors with improved contact arrangement in order to provide reasonable space for easily receiving an optical module.

2. Description of Related Art

U.S. Pat. No. 5,769,666 discloses an electrical connector including an insulative housing, a plurality of contacts retained in the housing and a metal shell covering the housing. The housing has a tongue extending forwardly from a front middle side thereof. The contacts include contact portions arranged on the tongue along a transverse direction of the housing and bending portions directly extending downwardly from rear ends of the contact portions. The bending portions are perpendicular to the contact portions and include contractive tail portions for being soldered to a PCB. The metal shell shields the contact portions for EMI protection. The bending portions directly extend downwardly from the rear ends of the contact portions, which make the bending portions occupy much area of a middle position of a rear wall of the housing. As a result, the rear wall of the housing doesn't have reasonable area at a middle position thereof for mounting other components from the rear to front direction.

Hence, an improved electrical connector is desired to overcome the above problems.

BRIEF SUMMARY OF THE INVENTION

According to one aspect of the present invention, an electrical connector defining a receiving opening for receiving a corresponding plug, comprises: an insulative housing having a tongue extending to the receiving opening and a cavity behind and neighboring to the receiving opening; a plurality of contacts attached to the insulative housing, each contact having a retaining portion retained in the insulative housing, a contact portion extending to the tongue from a front end of the retaining portion along a front to back direction, a tail portion for connecting with a circuit board and a connecting portion connecting the retaining portion and the tail portion; and an optical module forwardly assembled into the cavity from a rear side of the insulative housing and exposed to the receiving opening forwardly; wherein the connecting portions are offset relative to the contact portions of the corresponding contacts in a transverse direction so as to leave said cavity open rearward and allow said optical module to be forwardly assembled into the cavity from the rear side of the insulative housing.

According to another aspect of the present invention, an electrical connector electrical connector defining a receiving opening for receiving a corresponding plug, comprises: an insulative housing having a tongue extending to the receiving opening and a cavity under the tongue and communicating with the receiving opening; an optical module retained in the cavity and having a mating portion extending toward the receiving opening; and a plurality of contacts attached to the insulative housing, each contact having a contact portion extending to the tongue and exposed to the receiving opening, a tail portion for connecting with a circuit board and a connecting portion between the contact portion and the tail portion; wherein the contacts defines an internal space between adjacent connecting portions thereof, and the internal space has a dimension larger than that of the cavity along a transverse direction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
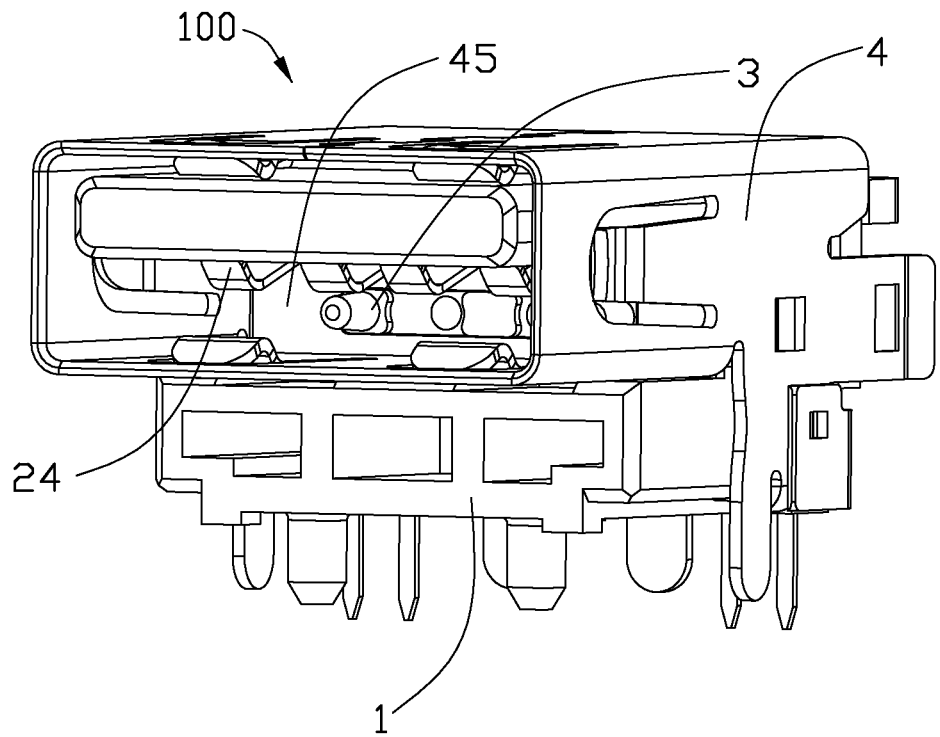
FIG. 1 is a perspective view of an electrical connector according to a first embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 2:
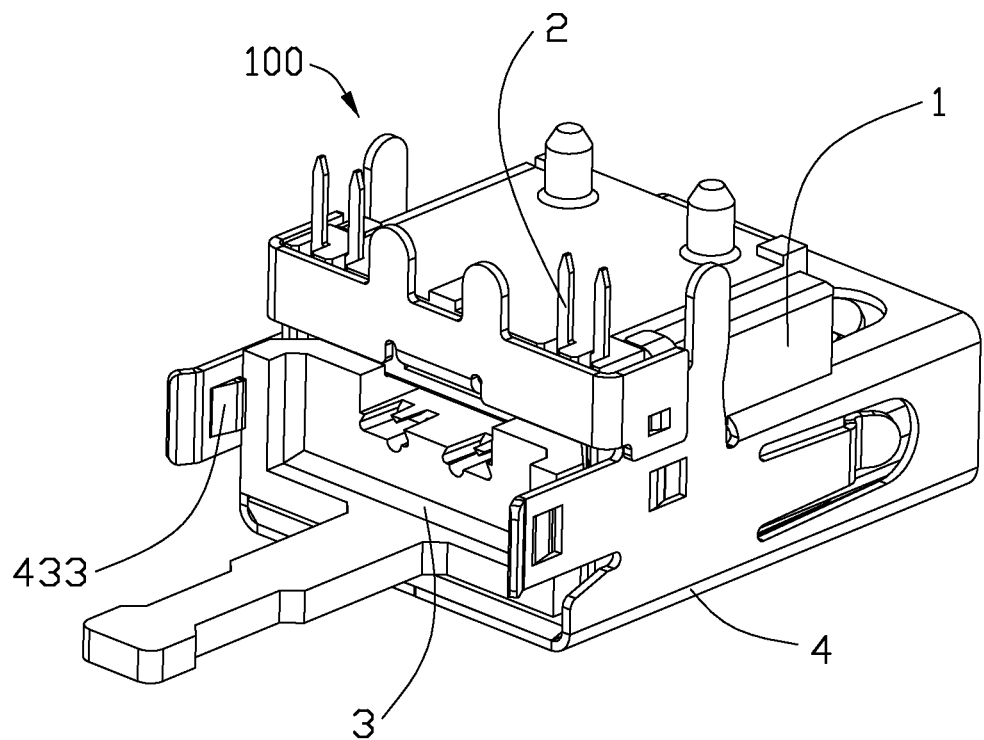
FIG. 2 is a view similar to FIG. 1, while taken from a different aspect.
Figure 3:
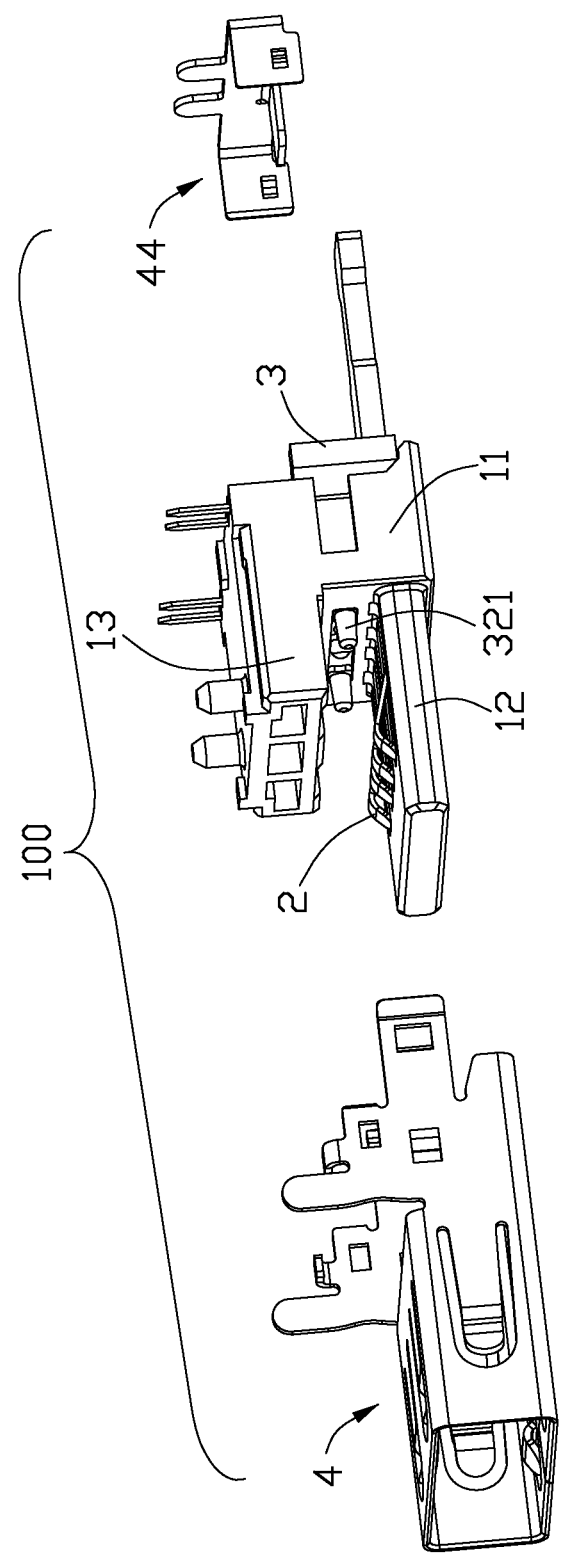
FIG. 3 is a partly exploded view of the electrical connector shown in FIG. 1.
Figure 4:
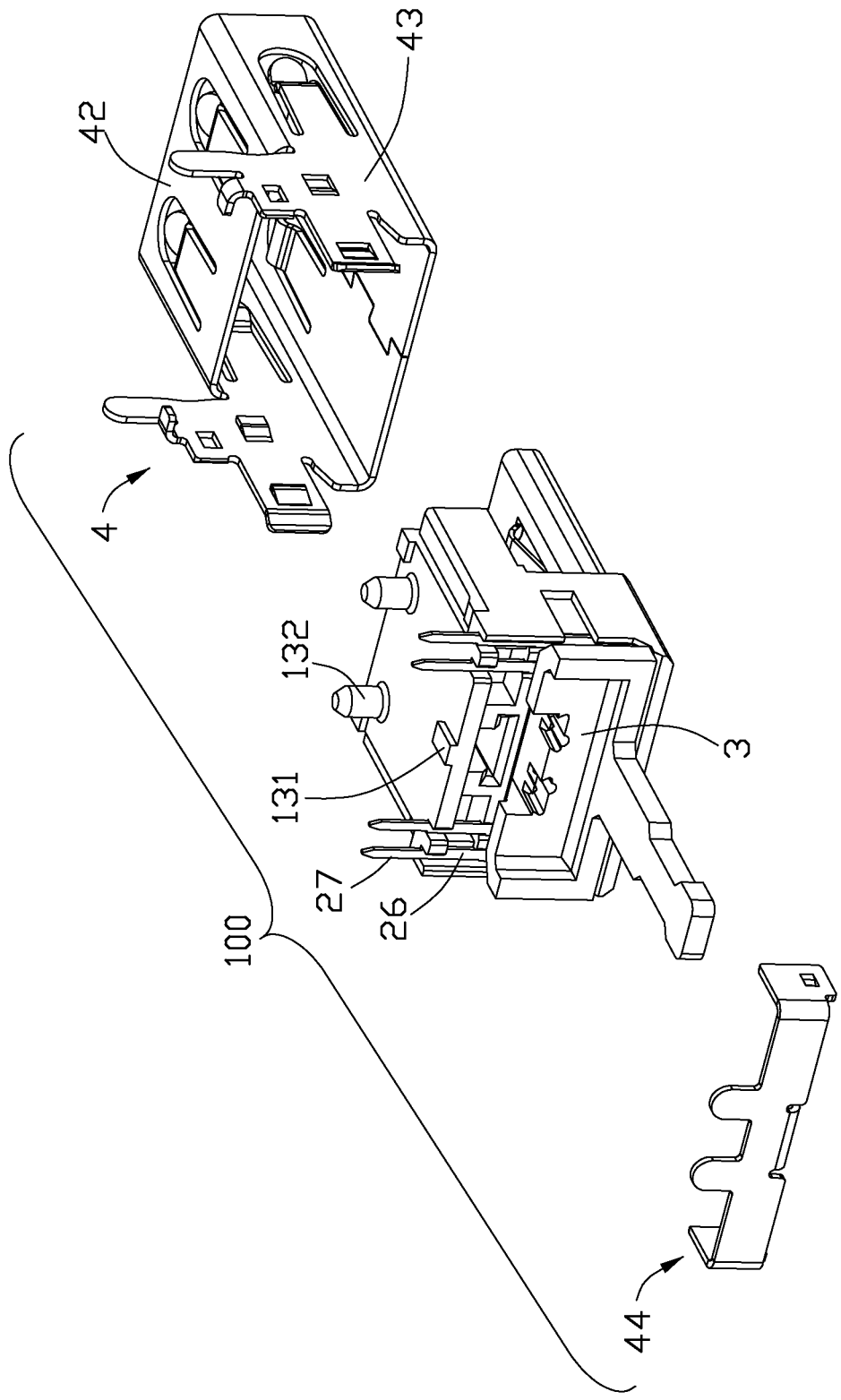
FIG. 4 is a view similar to FIG. 3, while taken from a different aspect.
Figure 5:
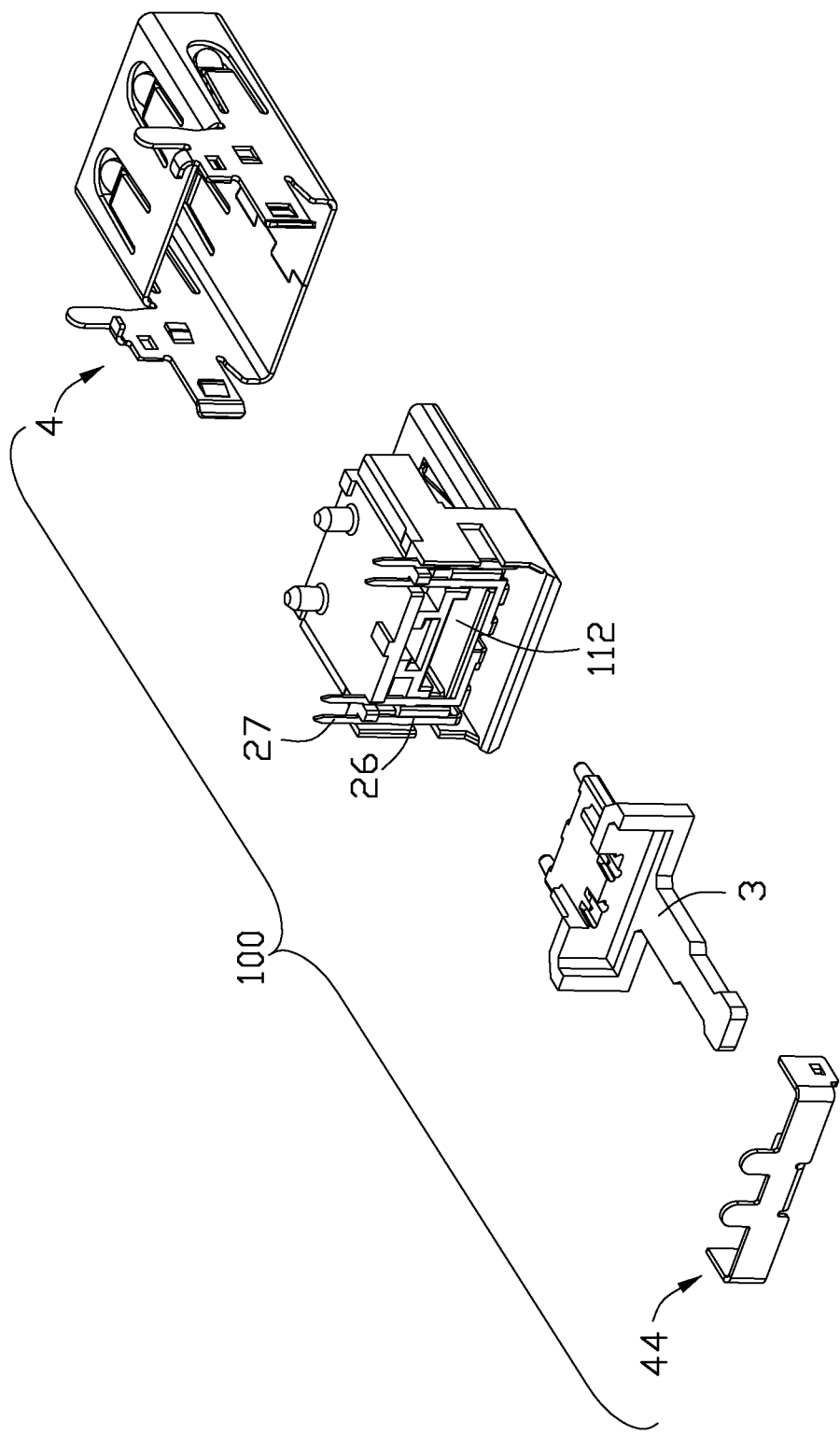
FIG. 5 is another partly exploded view of the electrical connector shown in the FIG. 1.
Figure 6:
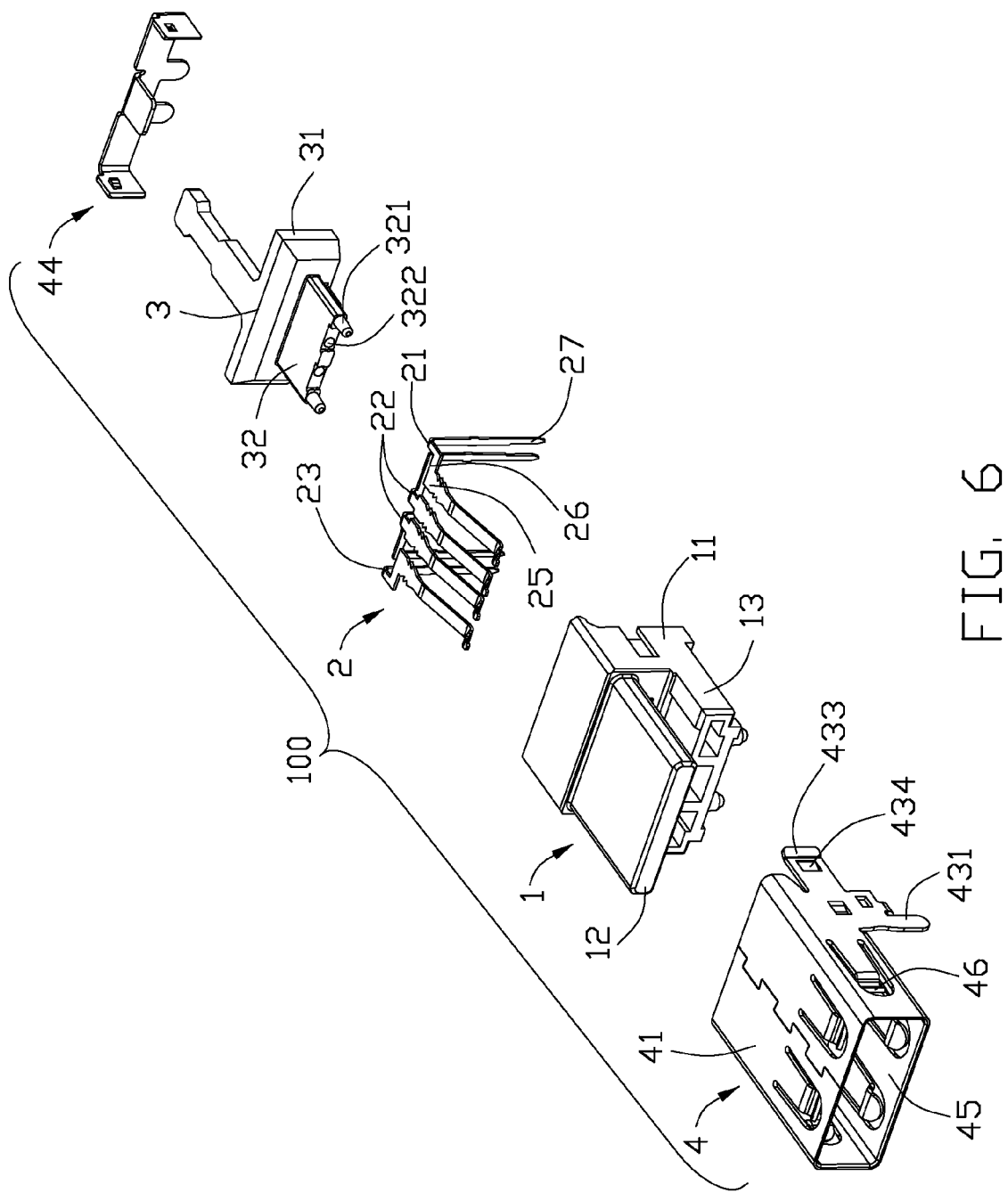
FIG. 6 is an exploded view of the electrical connector shown in the FIG. 1.
Figure 7:
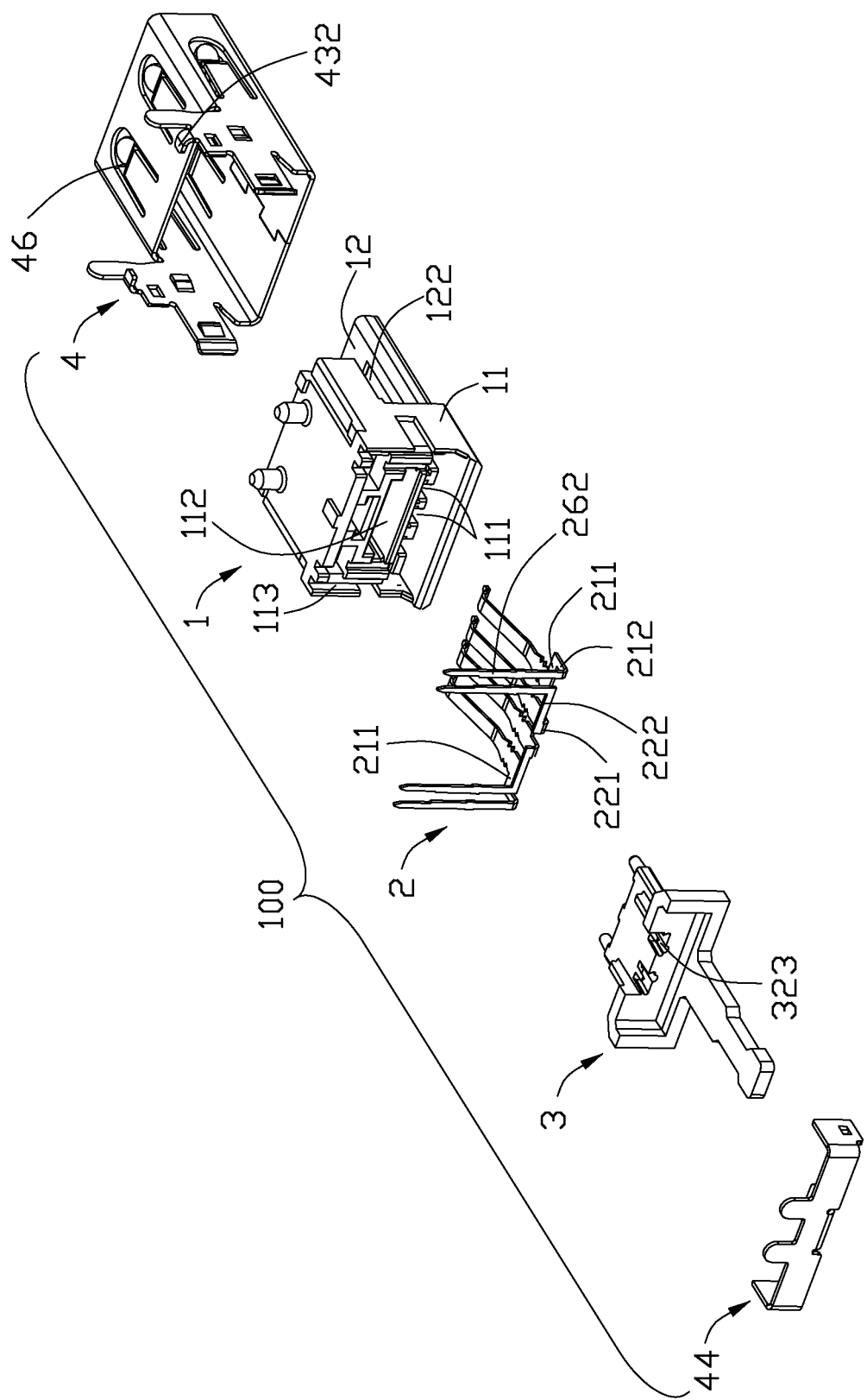
FIG. 7 is a view similar to FIG. 6, while taken from a different aspect.
Figure 8:
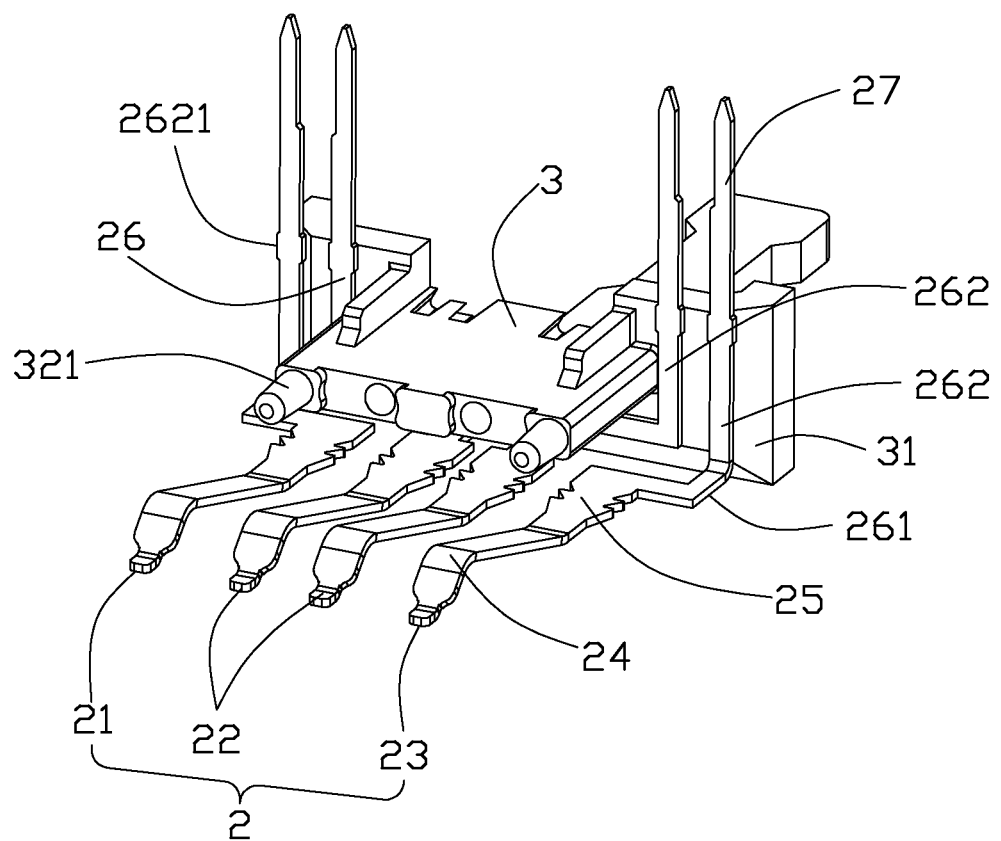
FIG. 8 is a perspective view of an optical module and a plurality of contacts of the electrical connector shown in the FIG. 1.

Referring to FIGS. 1-8 and 14, an electrical connector 100 for soldering to a circuit board (not shown) according to a first embodiment of the present invention is disclosed. The electrical connector 100 is an optical/electrical connector and can mate with an optical plug or a standard USB 2.0 plug (not shown). The electrical connector 100 comprises an insulative housing 1, a plurality of contacts 2 and an optical module 3 retained in the insulative housing 1, and a metal shell 4 covering the insulative housing 1. The electrical connector 100 defines a receiving opening 45 for receiving a corresponding plug.

The insulative housing 1 has a body portion 11, a tongue 12 and an assistant board 13 respectively projecting forwardly from an upper side and a lower side of the body portion 11. The body portion 11 defines four passageways 111 and a cavity 112 below the passageways 111. The passageways 111 and the cavity 112 extend through the body portion 11 along a front to back direction. A dimension of said cavity 112 is smaller than that of the receiving opening 45 along a transverse direction of the insulative housing 1. The cavity 112 is located behind and neighbored the receiving opening 45. The tongue 12 defines a plurality of recesses 122 recessed from a lower surface thereof and communicating with the passageways 111 along the front to back direction. The body portion 11 defines four grooves 113 extending along an up to down direction of the insulative housing 1. The four grooves 113 are located at two sides of the cavity 112 along the transverse direction and communicate with the passageways 111 along the front to back direction. The assistant board 13 has a plurality of protrusions 131 extending downwardly to seat on the circuit board and a pair of posts 132 to position the electrical connector 100 to the circuit board.

The contacts 2 are same to that of a standard USB 2.0 receptacle (not shown) and comprise a power contact 21, a grounding contact 23 and a pair of differential signal contacts 22 between the power contact 21 and the grounding contact 23. Each contact 2 has a retaining portion 25 retained in the passageways 111 of the body portion 11, an elastic contact portion 24 extending forwardly to the tongue 12 from a front end of the retaining portion 25, a tail portion 27 extending downwardly out of the insulative housing 1 to connect with the circuit board, and a connecting portion 26 connecting the retaining portion 25 and the tail portion 27 together. All elastic contact portions 24 are cantileveredly received in the recesses 122 and arranged in a row in a transverse direction of the insulative housing 1. The contact portions 24 are exposed in the receiving space 45 for electrically connecting with the optical plug or the standard USB 2.0 plug.

The connecting portions 26 are arranged in a row along the transverse direction, and each connecting portion 26 has a bending portion 261 extends from a rear end of the retaining portion 25 and a vertical portion 262 extending downwardly from the bending portion 261. The bending portions 261 are located at an upper side of the cavity 112. The vertical portions 262 are located at a common vertical plane and received in the grooves 113 at two sides of the cavity 112. Each vertical portion 262 has a plurality of embosses 2621 at two sides thereof to engage with the grooves 113.

The bending portions 261 of the grounding contact 23 and the power contact 21 each has a first portion 211 oppositely extend outwardly from an outer side of the rear end of corresponding retaining portions 25 in the transverse direction, and a second portion 212 extend backwardly. The vertical portions 262 of the grounding contact 23 and the power contact 21 extend downwardly from a rear end of the second portions 212. The bending portions 261 of the differential signal contacts 22 each has a first portion 221 bending downwardly from a rear end of corresponding retaining portion 25 and a second portion 222 extending outwardly from a lower end of the first portion 221. The vertical portions 262 of the differential signal contacts 22 extend downwardly from an outer end of corresponding second portion 222. Therefore, The connecting portions 26 are offset relative to the contact portions 24 of the corresponding contacts 2 in a transverse direction so as to leave said cavity 112 open rearward and allow said optical module 3 to be forwardly assembled into the cavity 112 from the rear side of the insulative housing 1 without hindrance by the connecting portions 26.

The optical module 3 has a base 31 at a rear side thereof and a mating portion 32 extending forwardly from the base 31. The base 31 is retained at a rear side of the insulative housing 1 and resists to a rear side of the vertical portions 262 to prevent the vertical portions 262 from moving backwardly. The mating portion 32 has a pair of posts 321 at two sides of a front end thereof for positioning with the optical plug, a pair of lens 322 between the posts 321, and a pair of channels 323 behind the lens 322 for receiving a pair of optical fibers (not shown) to transmit optical signals. The mating portion 32 extends into the cavity 112 from the internal space of the vertical portions 262 of the differential signal contacts 22, and the internal space defines a dimension larger than that of the cavity 112, thereby the mating portion 32 is not designed with a plurality of openings at a front side thereof for receiving the connecting portions 26. The mating portion 32 is received in the cavity 112 and exposed to the receiving opening 45 forwardly to mate with the optical plug. The mating portion 32 is located at a rear side of the contact portions 24 along the front to back direction and spaces apart from the contact portions 24 along the up to down direction.

The metal shell 4 covers the insulative housing 1 and is assembled to the insulative housing 1 along the front to back direction. The metal shell 4 has a pair of opposed top wall 41 and bottom wall 42, a pair of side walls 43 connecting the top wall 41 and the bottom wall 42 and a rear wall 44 connected with the side walls 43. The receiving opening 45 is formed between the top wall 41, bottom wall 42 and the side walls 43. The top wall 41, bottom wall 42 and side walls 43 each has at least a spring arm 46 extending into the receiving opening 45 to lock with or abut against corresponding plug. Each side wall 43 has a mounting leg 431 extending downwardly from a lower side thereof for positioning to the circuit board, a barb 432 extending inwardly from a lower side of thereof to lock with a lower side of the insulative housing 1, and an arm portion 433 extending backwardly from a rear side thereof. The arm portion 433 has a locking tang 434 extending inwardly and forwardly to abut against a rear end of the optical module 3 for preventing the optical module 3 from moving backwardly. The bottom wall 42 is located between the tongue 12 and the assistant board 13, thereby the bottom wall 42 can shield the contact portions 24, and the assistant board 13 can prevent the bottom wall 42 from being distorted.

Figure 9:
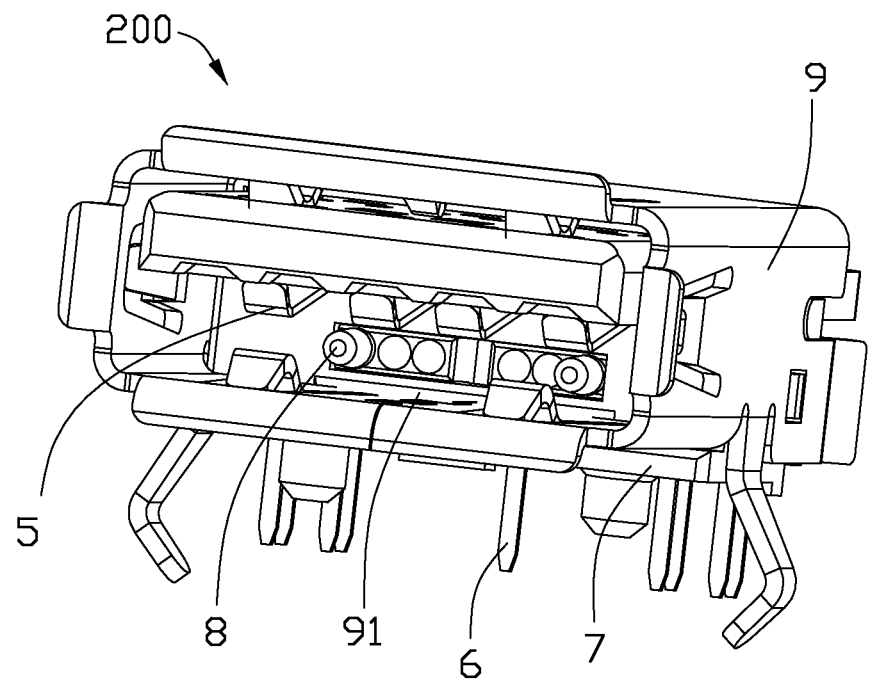
FIG. 9 is a perspective view of an electrical connector according to a second embodiment of the present invention.
Figure 10:
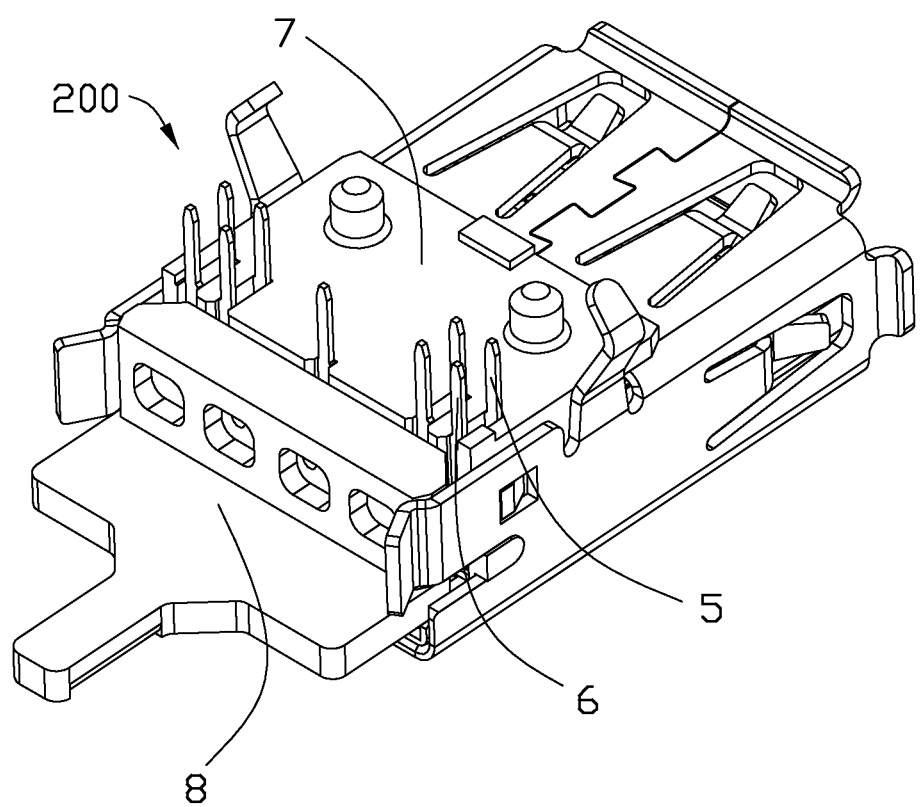
FIG. 10 is a view similar to FIG. 9, while taken from a different aspect.
Figure 11:
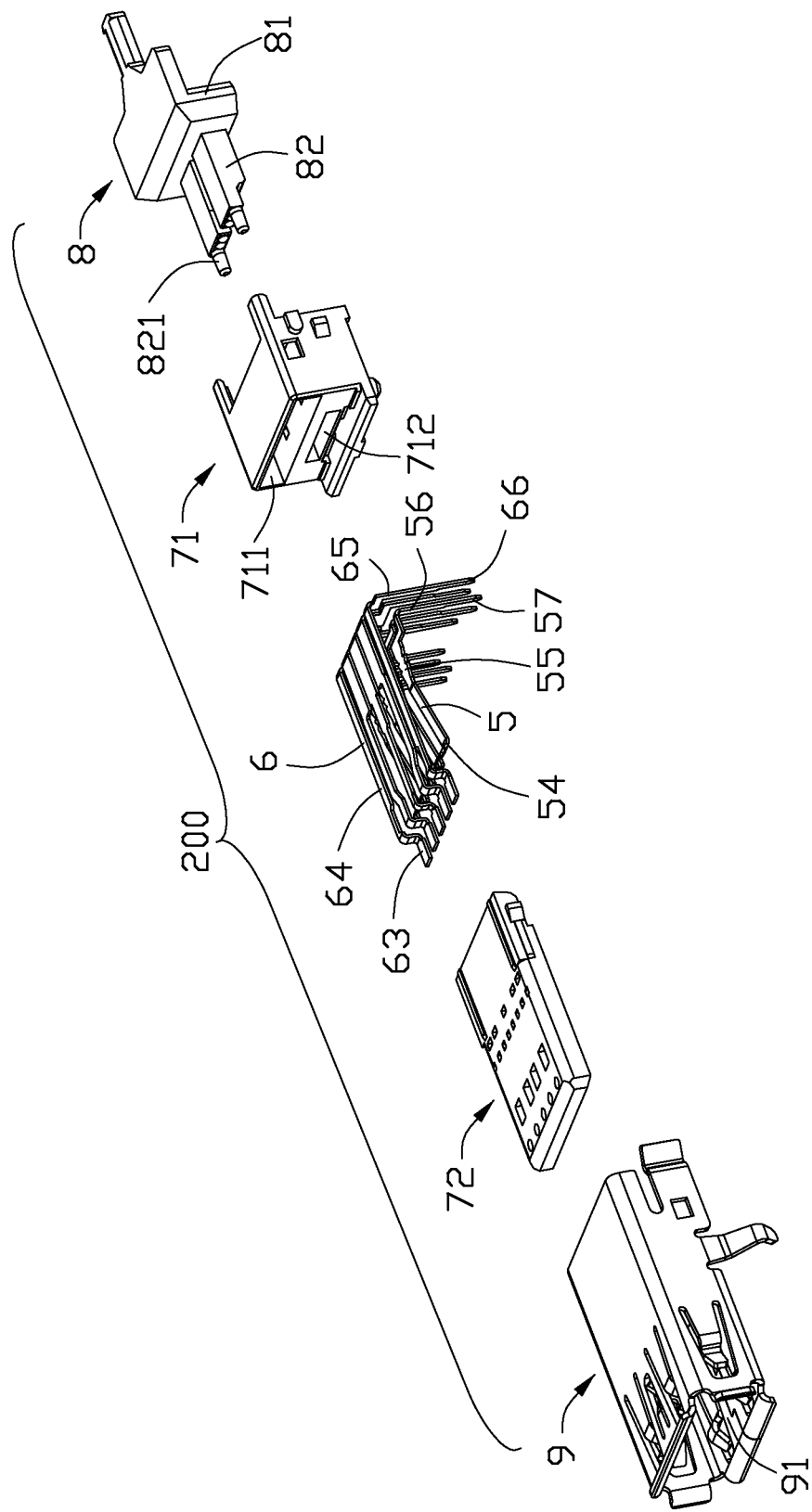
FIG. 11 is an exploded view of the electrical connector shown in FIG. 9.
Figure 12:
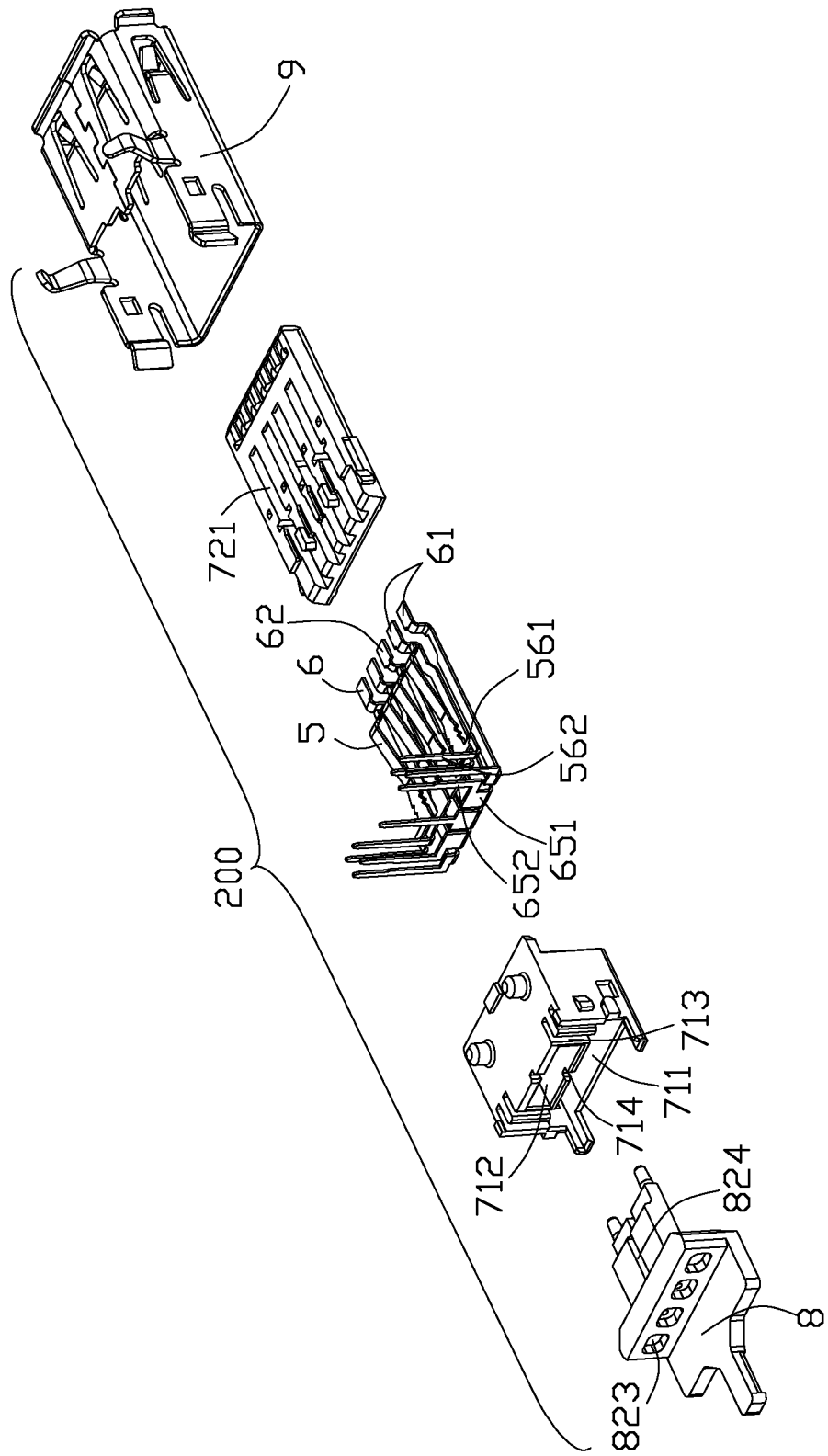
FIG. 12 is a view similar to FIG. 11, while taken from a different aspect.
Figure 13:
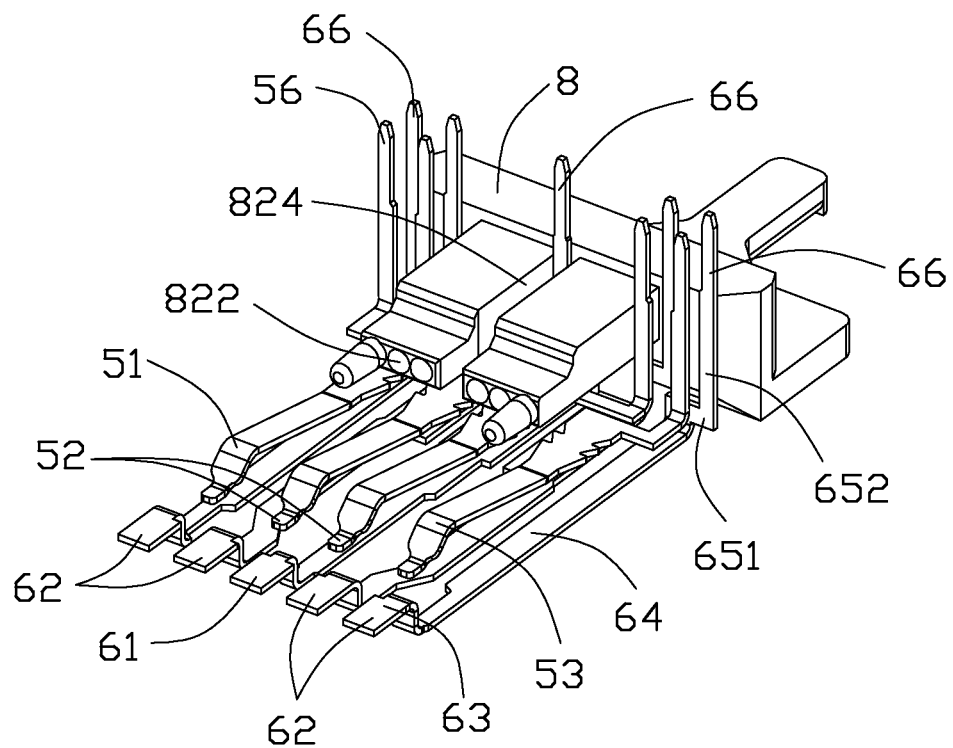
FIG. 13 is a perspective view of an optical module and a plurality of contacts of the electrical connector shown in FIG. 9.

Referring to FIGS. 9-13, an electrical connector 200 according to a second embodiment of the present invention is disclosed. The electrical connectors 100, 200 in the first and second embodiments are approximately similar to each other, and the difference is that: the contacts of the electrical connector 200 in the second embodiment not only comprise a plurality of first contacts 5 which are same to the contacts 2 in the first embodiment, but also comprise a plurality of second contacts 6 cooperating with the first contacts 5 to form contacts of a standard USB 3.0 receptacle to transmit USB 3.0 signals; and the body portion 71 and the tongue 72 of the insulative housing 7 in the second embodiment are molded separately and assembled together. Therefore, the electrical connector 200 in the second embodiment can mate with the USB 2.0 plug, a standard USB 3.0 plug and the optical plug.

An arrangement of the first contact 5 is same to that of the contacts 2 in the first embodiment. Therefore, the first contacts 5 comprises a pair of center differential signal contacts 52, a grounding contact 51 and a power contact 53 at two sides of the differential signal contacts 52. The second contacts 6 comprise two pairs of differential signal contacts 61 and a grounding contact 62 between two pairs of differential signal contacts 61.

The body portion 71 defines a first cavity 711 at an upper side thereof to retain the tongue 72 and a second cavity 712 below the first cavity 711 along the up to down direction. The first cavity 711 and the second cavity 712 extend through the body portion 71 along the front to back direction respectively and space apart from each other along the up to down direction. The tongue 72 is partly received in the first cavity 711 and extends into a receiving opening 91 of the electrical connector 200. A dimension of the second cavity 711 in the transverse direction is smaller than that of the first cavity 711 and the receiving opening 91. The body portion 71 defines two pairs of first grooves 713 at two outside of the second cavity 712 and a second groove 714 at a middle position of the second cavity 712. The first and second grooves 713, 714 extend along the up to down direction. The tongue 72 defines a plurality of slots 721 at a lower side there of.

Each first contact 5 has a retaining portion 55 retained in the slots 721 of the tongue 72, a contact portion 54 extending forwardly from a front end of the retaining portion 55, a connecting portion 56 bending from a rear end of the retaining portion 55 and a tail portion 57 extending downwardly from a lower end of the connecting portion 56. The contact portions 54 are cantileveredly received in the slots 721 and exposed to the receiving opening 91. The connecting portion 56 of each first contact 5 has a bending portion 561 extending from a rear end of the retaining portion 55 and a vertical portion 562 extending in the up to down direction. The bending portions 561 are averagely divided in two groups which bend outwardly along opposite two directions to make the vertical portions 562 corresponding to the two groups of bending portions 561 define an internal space therebetween, and the internal space defines a dimension larger than that of the second cavity 712 along the transverse direction, which can leave said second cavity 712 open rearward and allow an optical module 8 in the second embodiment to be forwardly assembled into the cavity 712 from the rear side of the insulative housing 7. The vertical portions 562 of the two groups are received in the first grooves 713.

Each second contact 6 also has a retaining portion 64 retained in the insulative housing 7, a contact portion 63 extending forwardly to a front edge of the tongue 72 from a front end of the retaining portion 64, a connecting portion 65 bending from a rear end of the retaining portion 65 and a tail portion 66 extending downwardly from a lower end of the connecting portion 65. The retaining portions 64 of the second contacts 6 are insert molded in the tongue 72. The contact portions 63 are flatly arranged on a lower surface of the tongue 72 and located at a front side of the contact portions 54. Thereby the contact portions 54, 63 are arranged in two rows along the front to back direction. Each connecting portion 65 of two pairs of differential signal contacts 61 has a bending portion 651 and a vertical portion 652 extending downwardly from the bending portion 651. The bending portions 651 extend to opposite two directions along the transverse direction to enlarge an internal space between the vertical portions 652. The internal space between two pairs of differential signal contacts 61 is aligned to that between the pair of differential signal contacts 52, and the vertical portions 652 of two pairs of differential signal contacts 61 are received in the first grooves 713 respectively and located behind and aligned to the vertical portions 562 of the first contacts 5 along the front to back direction. The connecting portion 65 of the grounding contact 62 directly bends downwardly from the rear end of the retaining portion 64 and is received in the second groove 714.

The optical module 8 has a base 81 at a rear side thereof and a mating portion 82 extending forwardly from the base 81. The base 81 is retained at a rear side of the insulative housing 7 and resists to a rear side of the vertical portions 562, 651 to prevent the vertical portions 562, 651 from moving backwardly. The mating portion 82 has a pair of posts 821 at two sides of a front end thereof, two pairs of lens 822 between the posts 821, and two pairs of channels 823 behind the lens 822 for receiving two pairs of optical fibers (not shown) for transmitting optical signals. The mating portion 82 extends into the second cavity 712 from the internal space of the vertical portions 562, 651 of the differential signal contacts 52, 62. Besides, the mating portion 82 defines an opening 824 extending inwardly from a front end for receiving the connecting portion 65 of the grounding contact 62. The mating portion 82 is received in the second cavity 712 and exposed to the receiving opening 91 forwardly to mate with the optical plug. The mating portion 82 is located at a rear side of the contact portions 54, 63 along the front to back direction and space apart from the contact portions 54, 63 along the up to down direction.

A metal shell 9 of the electrical connector 200 covers the insulative housing 7 and forms the receiving opening 91 with the tongue 72.

As fully described above, the connecting portions 26, 56, and 65 extend outwardly in opposite two directions to enlarge the internal space therebetween, and the internal space define a dimension larger than that of the cavities 112, 712, which can leave the cavities 112, 712 open rearward and allow the optical modules 3, 8 to be forwardly assembled into the cavities 112, 712 from the rear side of the insulative housing 1, 7, and the optical modules 3, 8 is not designed with more openings.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical connector defining a receiving opening for receiving a corresponding plug, comprising:
   an insulative housing having a tongue extending to the receiving opening and a cavity behind and neighboring to the receiving opening;
   a plurality of contacts attached to the insulative housing, each contact having a retaining portion retained in the insulative housing, a contact portion extending to the tongue from a front end of the retaining portion along a front to back direction, a tail portion for connecting with a circuit board and a connecting portion connecting the retaining portion and the tail portion; and
   an optical module forwardly assembled into the cavity from a rear side of the insulative housing and exposed to the receiving opening forwardly;
   wherein the connecting portions are offset relative to the contact portions of the corresponding contacts in a transverse direction so as to leave said cavity open rearward and allow said optical module to be forwardly assembled into the cavity from the rear side of the insulative housing.

2. The electrical connector as claimed in claim 1, wherein a dimension of said cavity is smaller than that of the receiving opening along the transverse direction.

3. The electrical connector as claimed in claim 2, wherein the connecting portions are arranged in a row in the transverse direction.

4. The electrical connector as claimed in claim 3, wherein the connecting portion has a bending portion extends outwardly from a rear end of the retaining portion and a vertical portion extending downwardly from the bending portion, the vertical portions are located at a common vertical plane and two sides of the cavity.

5. The electrical connector as claimed in claim 4, wherein the contacts comprise a grounding contact, a power contact and a pair of differential signal contacts between the grounding contact and power contact which form contacts of a standard USB 2.0 receptacle.

6. The electrical connector as claimed in claim 5, wherein the bending portions of the grounding contact and power contact oppositely extend outwardly from an outer side of the rear end of the retaining portions thereof in the transverse direction firstly and then extend backwardly, the bending portions of the differential signal contacts bend downwardly firstly and then oppositely extend outwardly, and the cavity is located at internal space between the vertical portions of the pair of differential signal contacts.

7. The electrical connector as claimed in claim 2, wherein the contacts comprise a plurality of first contacts with a pair of centre differential signal contacts, a grounding contact and a power contact at two sides of the differential signal contacts, and a plurality of second contacts with a centre grounding contacts and two pairs of differential signal contacts at two sides of the grounding contacts, the contact portions of the first and second contacts are disposed on a same surface of the tongue and arranged in two rows along a front to back direction which is compatible to a standard USB 3.0 plug, and the connecting portions of the first and second contacts are arranged in two rows along the front to back direction.

8. The electrical connector as claimed in claim 7, wherein connecting portions of the first contacts are averagely divided in two groups which oppositely extend outwardly to make the cavity open rearward between the differential signal contacts of the first contacts, the connecting portions of two pairs of differential signal contacts in the second contacts are aligned to the connecting portions of said two groups along the front to back direction.

9. The electrical connector as claimed in claim 8, wherein the connecting portion of the grounding contact in the second contacts directly extend downwardly from a rear end of the retaining portion.

10. The electrical connector as claimed in claim 9, wherein the optical module has a base retained at a rear side of the insulative housing and resisting to a rear side of the connecting portions and a pair of mating portions forwardly extending into the cavity, the mating portions are exposed toward the receiving space and offset from the contact portions along both an up to down and front to back direction.

11. The electrical connector as claimed in claim 1, wherein the optical module has a base retained at a rear side of the insulative housing and resisting to a rear side of the connecting portions and a mating portion forwardly extending into the cavity, the mating portion is exposed toward the receiving space and offset from the contact portions along both an up to down and front to back direction.

12. An electrical connector defining a receiving opening for receiving a corresponding plug, comprising:
an insulative housing having a tongue extending to the receiving opening and a cavity under the tongue and communicating with the receiving opening;
an optical module retained in the cavity and having a mating portion extending toward the receiving opening; and
a plurality of contacts attached to the insulative housing, each contact having a contact portion extending to the tongue and exposed to the receiving opening, a tail portion for connecting with a circuit board and a connecting portion between the contact portion and the tail portion;
wherein the contacts defines an internal space between adjacent connecting portions thereof, and the internal space has a dimension larger than that of the cavity along a transverse direction.

13. The electrical connector as claimed in claim 12, wherein the dimension of said cavity is smaller than that of the receiving opening along the transverse direction.

14. The electrical connector as claimed in claim 13, wherein the connecting portions are arranged in a row in the transverse direction, the optical module has a base at a rear side of the connecting portions.

15. The electrical connector as claimed in claim 14, wherein each contact has a retaining portion retained in the insulative housing, the connecting portions extend outwardly from a rear end of the retaining portions.

16. An electrical connector defining a receiving opening for receiving a corresponding plug, comprising:
an insulative housing having a tongue extending to the receiving opening and a cavity behind and neighboring to the receiving opening and lower than the tongue;
a plurality of contacts attached to the insulative housing, each contact having a contact portion extending to the tongue along a mating direction, a tail portion for connecting with a circuit board and a connecting portion connecting the retaining portion and the tail portion; and
an optical module having a vertical base and a horizontal mating portion extending from a front face of the base and forwardly assembled into the cavity from a rear side of the insulative housing and communicatively exposed to the receiving opening forwardly; wherein
the connecting portions of most contacts are located by two sides of the cavity in a rear so as to leave said cavity open rearward and allow said optical module to be forwardly assembled into the cavity from the rear side of the insulative housing.

17. The electrical connector as claimed in claim 16, wherein said optical module further includes a horizontal plate rearwardly extending from a rear face of the base.

18. The electrical connector as claimed in claim 17, wherein said horizontal plate is essentially at a same level with the tongue.

19. The electrical connector as claimed in claim 16, wherein the connecting portion of one of the remaining contacts is located at a centerline region of the housing, and the optical module defines a slot with an open front end in said centerline region to receive said connecting portion of said one of the remaining contacts therein so as to allow forward assembling of the optical module into the housing.

* * * * *